H. V. CATON.
Running-Gear for Vehicles.
No. 201,159. Patented March 12, 1878.
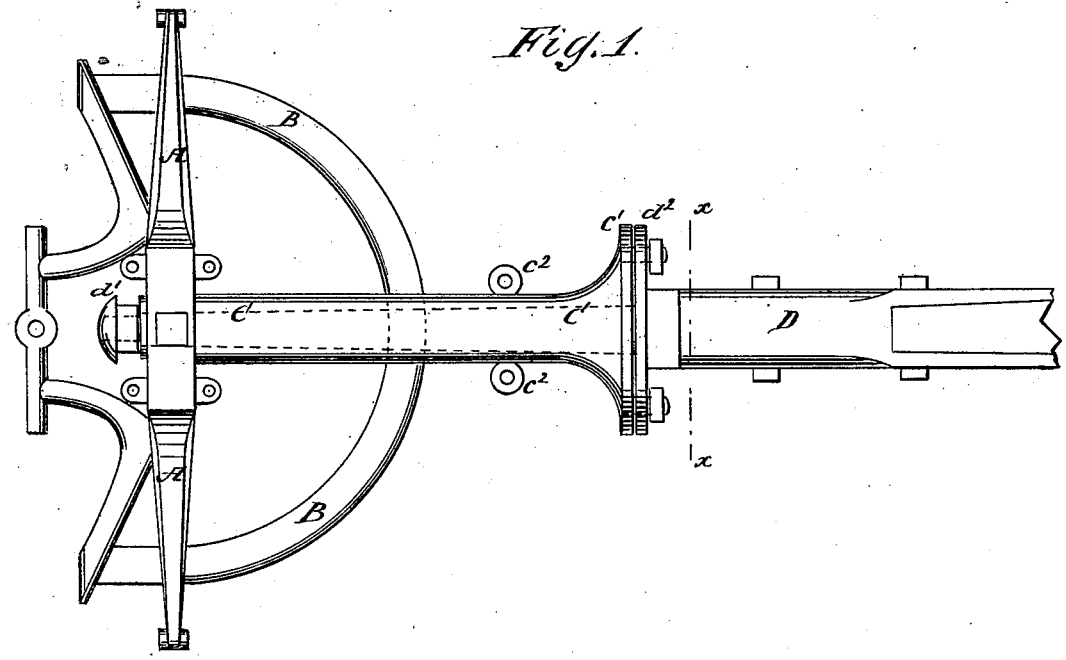
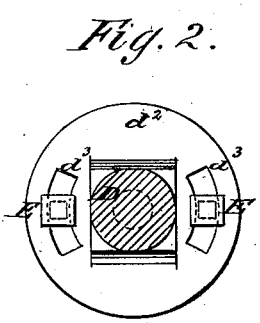

and straining the gearing, and which shall be simple in construction, inexpensive in manufacture, and effective in use.
UNITED STATES PATENT OFFICE.

HUGH V. CATON, OF PATRICKSBURG, INDIANA.

IMPROVEMENT IN RUNNING-GEARS FOR VEHICLES.

Specification forming part of Letters Patent No. 201,159, dated March 12, 1878; application filed December 23, 1876.

*To all whom it may concern:*

Be it known that I, HUGH V. CATON, of Patricksburg, in the county of Owen and State of Indiana, have invented a new and useful Improvement in Running-Gears for Wagons, of which the following is a specification.

Figure 1 is a top view of a part of the running-gear of a wagon to which my improvement has been applied. Fig. 2 is a cross-section of the same, taken through the line $x\,x$, Fig. 1.

Similar letters of reference indicate corresponding parts.

The object of this invention is to improve the construction of the running-gear of wagons, buggies, and other vehicles in such a way that either of the wheels may drop into a rut or rise over an obstruction without twisting and straining the gearing, and which shall be simple in construction, inexpensive in manufacture, and effective in use.

The invention will first be described in connection with the drawing, and then pointed out in the claim.

A represents the head-block, and B the fifth-wheel or sway-bar, of the wagon. C is the forward part of the reach, the forward end of which is firmly secured to the head-block A. The part C has a flange, $c^1$, formed upon its rear end, and is perforated longitudinally with a tapering hole, to receive the tapered forward end or spindle of the middle part D of the reach. The spindle of the part D also extends through the head-block A, and is secured in place with a nut, $d^1$. Upon the middle part D is formed a flange, $d^2$, which abuts against the flange $c^1$ of the forward part C. The rear end of the part D is slotted, and its lower side is channeled to receive the wooden rear part of the reach, which is secured in place by bolts. The flange $d^2$ has curved slots $d^3$ formed through it to receive the bolts E, which enter holes in the flange $c^1$, and serve to limit the rotary movement of the part C around the spindle of part D, as well as assist in holding the flanges $c^1$ $d^2$ in contact and relieve the spindle of undue strain. Upon the forward part C are formed eyes $c^2$, to which are fastened the ends of braces, to further strengthen the reach. By this construction either wheel can drop into a rut or rise over an obstruction without twisting or straining the gearing, and at the same time the parts of the reach will be firmly connected together and to the head-block A.

By making my perch-block in one piece with the fifth-wheel, which is cheaply accomplished by casting, I am enabled to overcome rattling, that is so common and so annoying to the car.

Having thus described my invention, I claim as new and desire to secure by Letters Patent—

The bored part C of the reach, having flange $c^1$, and the spindle portion D, having flange $d^2$, provided with curved slots $d^3$, and the bolts E E, all combined and arranged as shown and described, for the purpose specified.

HUGH V. CATON.

Witnesses:
R. C. MAGILL,
JOHN R. HARROLD.